D. G. LYZEN.
RAILWAY SIGNAL.
APPLICATION FILED NOV. 2, 1914.
1,210,503.
Patented Jan. 2, 1917.
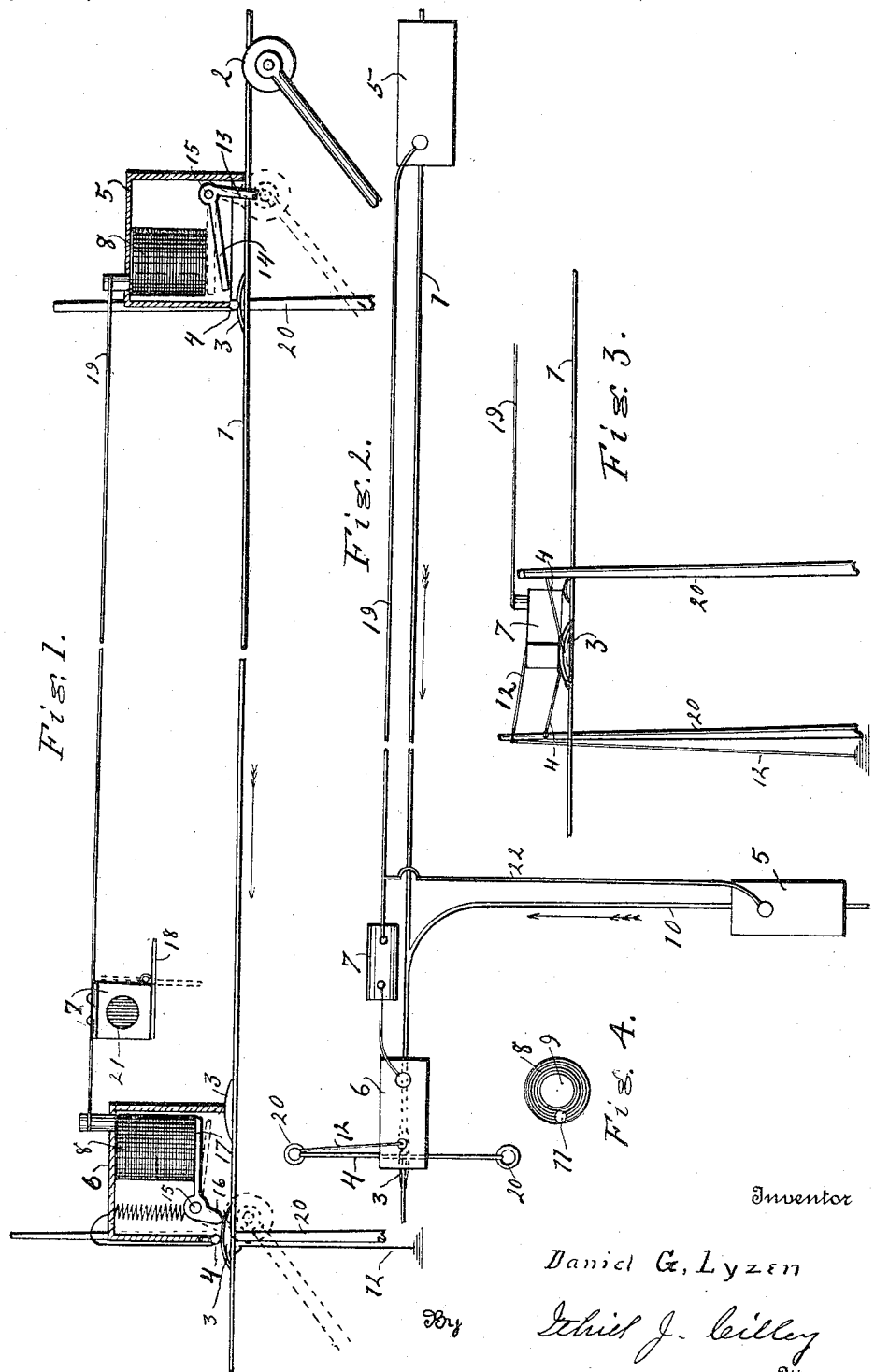
Inventor
Daniel G. Lyzen

UNITED STATES PATENT OFFICE.

DANIEL G. LYZEN, OF GRAND RAPIDS, MICHIGAN.

RAILWAY-SIGNAL.

1,210,503.

Specification of Letters Patent. Patented Jan. 2, 1917.

Application filed November 2, 1914. Serial No. 869,987.

*To all whom it may concern:*

Be it known that I, DANIEL G. LYZEN, a citizen of the United States, residing at Grand Rapids, in the county of Kent and State of Michigan, have invented certain new and useful Improvements in Railway-Signals, of which the following is a specification.

My invention relates to signals for use on electric trolley railway systems, and its object is to provide a means whereby conductors and motormen on one car may be apprized of the approach of a car on an intersecting or cross line of track and thus reduce the danger of accidents at these points, to the minimum. I attain this object by the mechanism, construction and arrangement of parts shown in the accompanying drawing, in which—

Figure 1 is a sectional elevation of my appliance showing its application to a trolley line; Fig. 2 is a plan of the system as applied to intersecting or cross lines of wires; Fig. 3 is a perspective of my appliance showing the manner in which it is connected with the trolley wires and the guy wire that supports the trolley wire, and, Fig. 4 is an end view of the temporary magnet, showing the relative positions of the core and the winding, and a contact plate for shunting the electricity from the trolley wire into the magnet coil.

Similar numerals refer to similar parts throughout the several views.

The arrows in the several views are designed to indicate the direction the cars are supposed to be moving.

In the several views 1 represents the trolley wire, 2 represents the trolley wheel, 3 represents the guy wire that supports the trolley wire and 20, 20 represent the trolley poles, all common in trolley line construction.

For the purpose of successfully applying my device to a trolley line in position for effective work I provide two containing boxes, 5, and 6, in which I place temporary magnets 8, 8, entirely detached from the trolley wires, said boxes being insulated from the wire by non-electric conducting brackets 3, 3, attached to the trolley wire. The magnets 8, 8 are connected by means of a conductor wire 19, and in case of an intersecting trolley wire line, a line of wire, 22, is shunted into the main wire 19, as indicated in Fig. 2. The target box 7 is properly connected in the line of the wire 19 so the target 21 will be illuminated when the armatures or arms 14 and 17 are properly connected with the magnets 8, 8 and with the trolley wire.

For the purpose of rendering my device operative at desired times I pivot a trip 13 in the box 5, as at 15. This trip has an arm 14 that projects practically at a right angle from it, in position so that when the trolley wheel 2 is moved to the position of its dotted lines at the right hand of Fig. 1, the arm 14 will be forced against the lower end of the magnet 8 where it will be held by the magnetic core 9, it being understood that the trip 13 is in contact with the electrically charged trolley wire 1, and that when the arm 14 is in contact with the coil 8 of the magnet, a current of electricity is shunted off of the trolley wire through this coil and along the wire 19 to the corresponding magnetic coil 8 in the box 6, from which it is taken by the arm 17 and conducted over the wire 12 to the earth, thus producing a current of electricity from the trolley wire through the magnets to the earth, forming strong temporary magnets of the core 9, in box 5, which holds the arm 14 in place after the trolley wheel has passed the trip 13 and until it strikes the trip 16 and removes the arm 17 from its magnet, thus breaking the electric circuit from the ground and deënergizing the magnet in the box 5.

The trip 16 is pivotally connected with the box 6, as at 15, and its weight is sufficient to normally hold the arm 17 against the lower end of the coil 8 in this box so that normally there is always an electric connection from the coil 8 in box 5 through the coil 8 in box 6 and thence to the earth. When the trolley wheel 2 is carried to the position indicated by its dotted lines under the box 6 it will engage the trip 16 and draw the arm 17 away from the magnet or coil 8 thus breaking the electric circuit and releasing the arm 14 so it will drop away from its magnet, thus breaking the electric circuit from the trolley wire through the magnets until another trolley wheel shall engage the trip 13 and throw the arm 14 again in contact with its magnet, as hereinbefore described. The trip 16 is so located that it never comes in contact with the trolley wire 1, or with any other electric circuit when the arm 14 is removed from its magnet, so no electric energy is passed through the magnetic coils except when the arm 14 is in actual contact with its magnet.

I provide for passing a current of electricity into the magnetic coils 8, 8 by leaving a bare end of the coil wire in contact with the core 9 of the magnet, so that electricity passing over the arm 14 will be taken off of the core by the coil wire and the magnets properly energized, or by placing a contact plate, as 11, in contact with an exposed wire in the coil, as indicated in Fig. 4, so that when the arms 14 and 17 are in contact with the cores 9, 9 and the proper connections are made the cores will become magnetized as hereinbefore stated.

In Fig. 1, 18 represents a flag or target that is hinged to either end of the target box 7 for use principally during day light.

21 represents a colored target light in the sides of the target box 7, identical with corresponding openings in the ends of the box, for warning cars approaching on intersecting or cross lines of the near approach of a car on the main line.

The electric wiring in this target system is so arranged that a car approaching a crossing from any direction will, as soon as the trolley wheel engages the trip 13, energize the target system and instantly warn a car or cars approaching from any other direction, thus reducing the possibility of accident at crossings to the minimum.

What I claim as new, and desire to secure by Letters Patent of the United States, is:—

1. In combination with a trolley system and a target system, containing boxes, temporary magnets in said boxes, angled levers pivotally mounted in said boxes, one arm of one of said levers in constant contact with the trolley wire and arranged to automatically close an electric circuit through the target system by the passing of the trolley wheel, the other lever arranged to break the electric circuit by the passing of the trolley wheel.

2. In combination with a trolley system, containing boxes, electromagnets in said boxes, a target electrically connected with said magnets, an angled lever pivotally mounted in one of said boxes with one arm in constant contact with the trolley wire and arranged to close an electric circuit through the target system by the passing of a trolley wheel, an angled lever pivotally mounted in the other containing box with one arm normally in contact with the magnet and having a ground connection, and the other arm so disposed that a passing trolley will automatically open the electric circuit that energizes the target system.

Signed at Grand Rapids, Michigan, October 26, 1914.

DANIEL G. LYZEN.

In presence of—
G. E. CORBIN,
I. J. CILLEY.

Copies of this patent may be obtained for five cents each, by addressing the "Commissioner of Patents, Washington, D. C."